(12) United States Patent
Bosson et al.

(10) Patent No.: US 10,189,177 B2
(45) Date of Patent: Jan. 29, 2019

(54) ENGINEERED TIMBER PRODUCTS, COMPONENTS AND METHODOLOGIES

(71) Applicant: WOOD ENGINEERING TECHNOLOGY LIMITED, Auckland (NZ)

(72) Inventors: Warwick Bosson, Auckland (NZ); Roger Frank Harrison, Auckland (NZ)

(73) Assignee: Wood Engineering Technology Limited, Auckland (NZ)

( * ) Notice: Subject to any disclaimer, the term of this patent is extended or adjusted under 35 U.S.C. 154(b) by 0 days.

(21) Appl. No.: 14/714,549

(22) Filed: May 18, 2015

(65) Prior Publication Data
US 2016/0039112 A1  Feb. 11, 2016

Related U.S. Application Data

(63) Continuation of application No. 13/511,775, filed as application No. PCT/NZ2010/000228 on Nov. 16, 2010, now abandoned.

(30) Foreign Application Priority Data

Nov. 25, 2009  (NZ) ........................ 581484

(51) Int. Cl.
F26B 5/14 (2006.01)
F26B 7/00 (2006.01)
(Continued)

(52) U.S. Cl.
CPC ............ B27K 5/007 (2013.01); B27K 3/0214 (2013.01); B27M 1/02 (2013.01); B27M 3/006 (2013.01);
(Continued)

(58) Field of Classification Search
CPC ...... F26B 3/00; F26B 3/20; F26B 5/14; F26B 7/00; F26B 19/00; F26B 25/185;
(Continued)

(56) References Cited

U.S. PATENT DOCUMENTS 954,041 A * 4/1910 McDougall ........... F26B 25/185
211/134
3,907,130 A * 9/1975 Hutcheson ............ F26B 25/185
34/94
(Continued)

FOREIGN PATENT DOCUMENTS

EP  0534340  3/1993
JP  2001-198905  7/2001
(Continued)

*Primary Examiner* — Jessica Yuen
(74) *Attorney, Agent, or Firm* — Foley & Lardner LLP

(57) ABSTRACT

A method of drying sticks, a related apparatus, resultant product and its uses where the method involves presenting a plurality of sticks in parallel as a single layer, pressing each stick with a bank of pressing members on and/or into at least one face of the sticks, each with plurality of protuberances, thereby to constrain the sticks against crook, and drying the sticks when so constrained. Preferably each bank of pressing members is an underside of a frame or lattice of a stack of such frames or lattices able to receive such a single layer of sticks between adjacent overlying/underlying frames or lattices, the protuberances preferably being only downwardly directed.

20 Claims, 10 Drawing Sheets

(51) Int. Cl.
  *F26B 19/00* (2006.01)
  *B32B 21/13* (2006.01)
  *B27K 5/00* (2006.01)
  *B27M 3/00* (2006.01)
  *B32B 3/14* (2006.01)
  *B32B 3/18* (2006.01)
  *B32B 21/14* (2006.01)
  *F26B 9/04* (2006.01)
  *F26B 25/18* (2006.01)
  *B27K 3/02* (2006.01)
  *B27M 1/02* (2006.01)

(52) U.S. Cl.
  CPC ............... *B32B 3/14* (2013.01); *B32B 3/18* (2013.01); *B32B 21/13* (2013.01); *B32B 21/14* (2013.01); *F26B 5/14* (2013.01); *F26B 7/00* (2013.01); *F26B 9/04* (2013.01); *F26B 19/00* (2013.01); *F26B 25/185* (2013.01); *F26B 2210/16* (2013.01)

(58) Field of Classification Search
  CPC ........ F26B 9/04; F26B 2210/16; B27K 5/007; B27K 3/0214; B27M 1/02; B27M 3/00; B27M 3/006; B32B 21/13; B32B 21/14; B32B 3/14; B32B 3/18; B32B 13/14; B27D 3/02; B30B 15/34
  See application file for complete search history.

(56) References Cited

U.S. PATENT DOCUMENTS

| | | | | |
|---|---|---|---|---|
| 4,017,980 | A * | 4/1977 | Kleinguenther | F26B 7/00 100/38 |
| 4,824,063 | A * | 4/1989 | Miller | F26B 25/18 248/346.01 |
| 5,564,199 | A | 10/1996 | Yamamoto | |
| 6,007,659 | A | 12/1999 | Hasegawa | |
| 6,203,738 | B1 * | 3/2001 | Vaders | B27N 3/08 264/156 |

FOREIGN PATENT DOCUMENTS

| | | |
|---|---|---|
| NZ | 524672 | 3/2004 |
| NZ | 561307 | 12/2008 |
| WO | 02/081992 | 10/2002 |

* cited by examiner

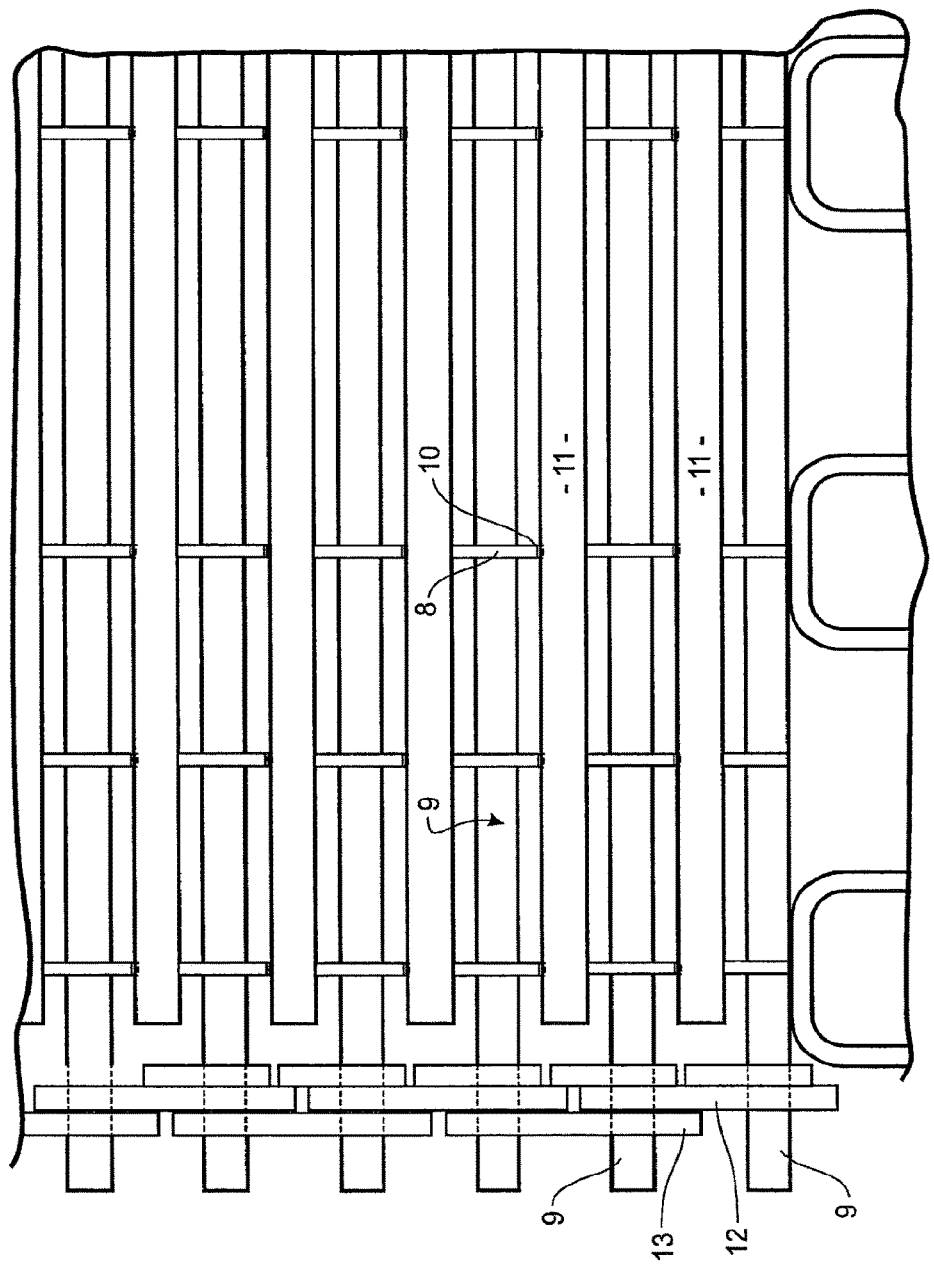

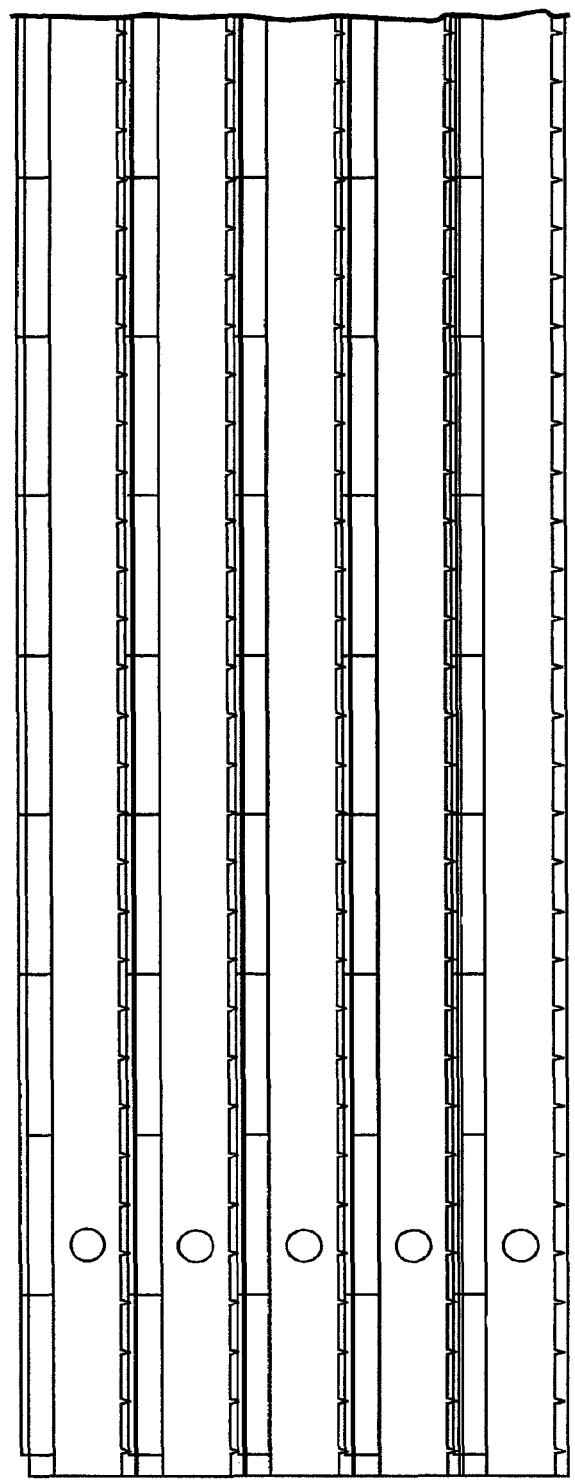

ENGINEERED TIMBER PRODUCTS, COMPONENTS AND METHODOLOGIES

The present invention relates to the preparation of components for engineering into longer lengths and/or subsequent lamination to provide an elongate engineered timber product.

In our New Zealand patent specification number 524672/531750 we disclose a rationale for engineered timber products and discuss efforts, in that respect that have been carried on in the past as well as setting out a variety of options for both structural and appearance grade engineered timber from almost any feedstock.

In our New Zealand patent specification 561307 we more specifically claim:

"An engineered elongate structural lumber product of square or rectangular cross section and length L greater than 2.4 m,
wherein said product is, or is dressed back from, a laminate, wide face to wide face, of at least four engineered laminae of identical rectangular cross-section, the engineered laminae
(a) being of a width of at least the full dimension on one transverse axis of the structural lumber product,
(b) being layered serially to provide, with the accumulated cross-sectional thickness of mutually adhered engineered laminae, at least the other full dimension of the structural lumber product on the other transverse axis of the structural lumber product,
(c) being of at least length L; and
(d) being derived from end-wise joined uniform laminar thickness boards of less than length L (hereafter "sticks") of rectangular section of no greater than 17 mm thick and of width not substantially greater than the width of the square cross-section or lesser dimension of the rectangular cross-section of the product,
(e) being each derived from a ranked stream of contributing sticks, the sticks of each stream being ranked by a stick by stick test, post drying, for a strength or stiffness, or both, characteristic into a ranked category, and;
(f) being each derived from contributing sticks ranked by such characteristic or characteristics into at least three ranked categories;
and wherein there has been a profiled layering of said engineered laminae across that other full dimension of the structural lumber product, profiled by the ranking of the contributing sticks of each engineered laminae and the strength or stiffness, or both, characteristic wanted for the product."

Preferments included
said engineering laminae are greater than 4 mm thick.
said engineered laminae are less than 15 mm thick.
said engineered laminae are of about 46 mm width.
said contributing sticks are from 0.5 to 1.2 meters long.
the end wise joints of contributing sticks are finger joints.
there are greater than four engineered laminae in the product.
the contributing sticks have been ranked by such characteristic or characteristics into at least four ranked categories.
the contributing sticks have been ranked by such characteristic or characteristics from four to eight ranked categories.
said profiled layering of said engineered laminae is that derived from contributing sticks of greatest strength or stiffness, or both, to the outside.

The full content of the aforementioned patent specifications is here included by way of reference.

The present invention has as an aim, a means and methodology to facilitate the manufacture of sticks (not necessarily only of the dimensions referred to previously) but which are a precursor to end wise jointing (preferably by finger jointing) to provide an engineered lamina as previously defined and suitable for incorporation into such a laminated product.

It is therefore an object of the present invention to provide a methodology, apparatus, and products resulting from the use of such methodology and/or apparatus (whether suitable in an aforementioned engineering elongate structural lumber product of square or rectangular cross section, or not) of reducing crook or eliminating crook. During a process of timber drying; crook (deviation or change in direction from the lengthwise axis while not deviating from the plane of the wide face of the cross-section) can be a problem without proper constraint during the drying process.

In an aspect the invention consists of a method of drying a plurality of sticks of square or rectangular cross-section, said method comprising or including the steps of
advancing the sticks laterally onto an underlying frame which will allow drying of the underlying surface of the sticks,
squeezing the sticks when laterally received on the underlying frame to said underlying frame using an overlying frame carrying spaced penetrative members, said overlying frame with spaced penetrative members penetrating the upper surfaces of the sticks allowing drying of the upper most surface of the sticks, and
allowing and/or causing drying to occur whilst the sticks are so constrained by such squeezing.

Preferably after at least sufficient drying of the sticks whilst constrained to reduce a tendency of crook, the squeezing is released by a lifting of the overlying frame and the sticks are moved laterally from the underlying frame.

Preferably said sticks are contiguous on the underlying frame.

Preferably the squeezing is performed in a stack of frames that are skeletal in nature, each adjacent pairing to act as a pair of underlying and overlying frames, several frames acting as both an overlying frame and an underlying frame of different parts.

Preferably said squeezing the sticks onto the underlying frame using spaced penetrative members of the overlying frame ensures top surface penetration by at least two penetrative members for each stick at each of several positions along the length of the stick.

Preferably there are at least three penetrative members for each stick at each position along the length of the stick Preferably each stick is of substantially identical thickness and is in the thickness range, top surface to bottom surface, of from 5 to 25 mm.

Preferably the range is from 5 to 17 mm.
Preferably the thickness is about 11 mm.
Preferably each underlying frame is skeletal.
Preferably each underlying frame is of rails or bars fixed in a spaced parallel relationship.
Preferably said penetrative members are on or of an underside of said rails or bars.
Preferably the penetrative members are pins.
Preferably the pins are profiled from a rail or bar of the frame.
Preferably each overlying frame and underlying frame pair matches rail or bar over rail or bar.
Preferably the rail or bars are laterally of the stick axes.

Preferably spacing of rails or bars of each frame are closer together near the ends of the sticks than centrally of the sticks.

Preferably the penetrative members are of or from the underside of the rails or bars.

In another aspect the invention consists of a method of drying one or more stick which comprises or includes, in and/or in eventual drying conditions, laterally of the longitudinal axis of the, or each, stick and into one such face of its, or their, wider opened faces, constraining the, or each, stick between
  (A) a plurality of protuberances penetrative and/or able to apply a high localised loading of the stick(s) from multiple bar, fillet or like support members, and
  (B) a reactive arrangement on the other face.

In another aspect the invention consists of a method of drying sticks, said method comprising or including:
  presenting a plurality of sticks in parallel as a single layer,
  pressing each stick with a bank of pressing members on and/or into at least one face of the sticks, each with a plurality of protuberances, thereby to constrain the sticks against crook, and
  drying the sticks when so constrained.

In another aspect the invention consists of an apparatus operable or to be operable as during frames to constrain sticks during drying, the apparatus being in the form of a stack of layers of skeletal frames, each adjacent pair of frames to receive a layer of sticks therebetween with the sticks mutually at least substantially parallel by having been advanced laterally of their elongate axes on an underlying frame of the pair and then being squeezed onto the underlying frame by the overlying frame of the pair, each such overlying frame having protuberances to penetrate each stick on its upper face to constrain the sticks.

In another aspect the invention consists of an apparatus for holding sticks for drying, said apparatus comprising upper and lower lattices or frames being able to be brought to bear on opposed faces of each stick, at least one of the lattices or frames having sets of protuberances able to apply pressure into the stick against the reaction of the other lattice or frame, thereby, at intervals along the length of the stick, to have each set of protuberances, for each stick, having at least two protuberances bearing into the stick transversely of the face.

In still a further aspect the invention consists of a method of drying sticks whilst constrained, said method comprising interposing the sticks between frames against one frame using protuberances of the other frame penetrative of the sticks.

Preferably an apparatus for drying sticks substantially has herein described with reference to any one or more of the accompanying drawings.

Preferably a method of drying sticks substantially when performed using penetrative pressing from at least one face substantially as herein described with or without reference to any one or more of the accompanying drawings.

In yet another aspect the invention is a dried stick, when dried substantially as herein described.

In another aspect the invention is an engineered elongate structural lumber product of square or rectangular cross section and length L greater than 2.4 m,
  wherein said product is, or is dressed back from, a laminate, wide face to wide face, of at least four engineered laminae of identical rectangular cross-section, the engineered laminae
    (a) being of a width of at least the full dimension on one transverse axis of the structural lumber, product,
    (b) being layered serially to provide, with the accumulated cross-sectional thickness of mutually adhered engineered laminae, at least the other full dimension of the structural lumber product on the other transverse axis of the structural lumber product,
    (c) being of at least length L; and
    (d) being derived from end-wise joined uniform laminar thickness boards of less than length L (hereafter "sticks") of rectangular section of no greater than 17 mm thick and of width not substantially greater than the width of the square cross-section or lesser dimension of the rectangular cross-section of the product,
    (e) being each derived from a ranked stream of contributing sticks, the sticks of each stream being ranked by a stick by stick test, post drying, for a strength or stiffness, or both, characteristic into a ranked category, and;
    (f) being each derived from contributing sticks ranked by such characteristic or characteristics into at least three ranked categories;
  and wherein there has been a profiled layering of said engineered laminae across that other full dimension of the structural lumber product, profiled by the ranking of the contributing sticks of each engineered laminae and the strength or stiffness, or both, characteristic wanted for the product,
  and wherein each contributing stick was constrained by clamping their opposed wider faces, at least one of the wider faces being penetrated during such clamping by penetrative members.

In another aspect the invention consists in a method of drying one or more stick (eg. as aforesaid) which comprises or includes, laterally of the longitudinal axis of the or each stick and from at least one of its or their wider faces, constraining the or each stick with (A) a plurality of protuberances (eg, "pins" whether pointed, flat surfaced, plateaued, or otherwise and whether integrally formed, fabricated or otherwise present) from a bar, fillet or like support member ["bar"], and/or (B) other spaced pressure applying and/or stick penetrating forms.

Preferably said "pins" can be of any form but preferably are emergent from an edge region of a bar.

Preferably a parallel set of like bars, fillets, or the like, each with pins, are used for the constraint, each bar with a set of pins being adapted to apply force on said wider face preferably over at least substantially the full length of the stick.

Preferably the spacing of bar to bar is closer near the ends of the stick for any of the reasons hereinafter described.

Preferably the spacing of the bars mid length can be less than at the ends. In other embodiments equal spacing can be used.

In another aspect the invention is a method of drying sticks, said method comprising or including:
  presenting a plurality of sticks in parallel as a single layer,
  pressing each stick with a bank of pressing members, each with a plurality of protuberances, thereby to constrain the sticks against crook, and
  drying the sticks when so constrained.

Preferably the bank of pressing members is of bars, fillets or the like, each with protuberances, adapted to press at least substantially transversely of each stick length.

Preferably the single layer is on a support.

Preferably the support is a non-protuberance opposite side of each said bar, fillet or the like.

Preferably the sticks are presented and/or removed transversely of their elongate axes.

In an aspect the invention is a drying frame for sticks in the form of a stack of layers of skeletal frames, each adjacent pair of frames to receive a layer of sticks therebetween mutually in parallel by having been advanced laterally of their elongate axes and then each adjacent pair of frames being actuable (eg. by loading, etc), in use in drying conditions, to hold squeezed, each such layer with protuberances penetrating each stick on at least one face to constrain the sticks against crook.

Preferably rows of teeth act as the protuberant members.

Preferably top and bottom extremities of bars, fillets, or the like of each pair interact to provide a clamping effect transversely of the elongate axes of the sticks with at least protuberances penetrating each stick from above.

In another aspect the invention consists in apparatus for holding sticks (preferably substantially as aforesaid) for drying, said apparatus comprising upper and lower lattices being able to be brought to bear on opposed faces of each stick, at least one of the lattices having sets of protuberances (eg. pins as aforesaid) able to apply pressure into the stick against the reaction of the other lattice, thereby, at intervals along the length of the stick, to have each set of protuberance, for each stick, having at least two protuberances bearing into the stick transversely of the face.

The invention also is a method of drying sticks, a related apparatus, resultant product and its uses where the method involves presenting a plurality of sticks in parallel as a single layer, pressing each stick with a bank of pressing members on and/or into at least one face of the sticks, each with a plurality of protuberances, thereby to constrain the sticks against crook, and drying the sticks when so constrained. Preferably each bank of pressing members is an underside of a frame or lattice of a stack of such frames or lattices able to receive such a single layer of sticks between adjacent overlying/underlying frames or lattices, the protuberances preferably being only downwardly directed.

In a further aspect the invention consists in a stick, an engineered lamina or laminated engineered product substantially as hereinafter described.

In a further aspect the invention consists in any product of a method or apparatus as herein described with or without reference to any one or more of the accompanying drawings.

As used herein the term "and/or" means "and" or "or", or both.

As used herein the term "(s)" following a noun includes, as might be appropriate, the singular or plural forms of that noun.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

A preferred form of the present invention will now be described with reference to the accompany drawings in which FIG. 1 an isometric view of an engineered product, being a lamination of, by way of example, nine engineered lamina (arrayed in the lamination by reference to strength properties so as to provide the strength characteristic for the engineered product required), the finger jointing [should there be finger jointing in any particular lamina] preferably being staggered throughout the engineered laminate, FIG. 2 shows a deeper lamination to that of FIG. 1, FIG. 3A shows a typical stick after drying by a process of the present invention showing an unprepared end at the right hand end with arrays of three pin holes resulting from penetration of the protuberances transversely across the broader face of the stick, the sets of such arrays being close together near the free end of the stick, FIG. 3B is the same stick of FIG. 3A but showing the right hand end prepared for finger jointing with a streamed complementary stick, FIG. 3C shows the stick of FIG. 3B finger jointed with a streamed-like stick, thereafter as a streamed engineered lamina to be taken to magazines for assembly as required into the profile of streamed characteristics required for the end use of a product, such as for example, depicted in FIG. 1 or FIG. 2, FIG. 4 shows an example of one sequence of steps that can be utilised in order to provide products as referred to in FIGS. 1 and 2, the sticks provided being, for example substantially, as shown in FIG. 3A, FIG. 5A shows a plan view of a suitable lattice, frame or array of fillets, bars or the like of the present invention in plan, the view being from above and not showing the downwardly extending protuberances of each bar, fillet or the like, showing also the more close spacing of such bars or fillets near the end of the lattice, and showing transversely of the bars or fillets the lattice providing bars, tubes or the like, such linking members being parallel to the direction in which the sticks will lie between such lattices, FIG. 5B is a perspective view of the arrangement of FIG. 5A but from below, FIG. 5C shows the lattices of FIGS. 5A and 5B as they might be stacked to achieve the purpose of the present invention ie. to constrain layers of sticks in a drying environment, FIG. 5D is a view from one end of the stack of FIG. 5C, FIG. 6 shows a diagram of how the linking bars, tubes or the like can be uplifted by a tying member that loosely associates with each thereby to allow upward expansion and thus separation of the individual lattices thereby to allow stick advancement (the sticks being shown diagrammatically in transverse section), to be advanced to the left or to the right when the downwardly shown protuberances do not press into the individual sticks, FIG. 7 is a view transversely of the edge of individual sticks showing how in the penetrating condition downwardly extending protuberances of each bar, fillet or the like constrains the stick down onto the preferably non-protuberant smooth upper edge of the underlying lattice, FIG. 8 is another diagrammatic view from a similar direction as is FIG. 6, FIG. 9A is a plan view of apparatus carrying the stacks of for example FIGS. 5C and 5D, FIG. 9B is a side elevational view of the arrangement of FIG. 9A, and FIG. 9C is an end elevation of the arrangement shown in FIGS. 9A and 9B.

During the process of timber drying crook (deviation or change in direction from the lengthwise axis while not deviating from the plane of the wide face of the cross-section) is eliminated and/or minimized by adding pins to the "fillets" used to stack the timber with air gaps to allow drying air flow.

FIGS. 1 and 2 show just two of many different examples of laminated product that can be made for use structurally.

Choice of properties of streamed stick engineered laminae can be profiled to address whatever bending moments the structural element is to resist. See the aforementioned patent specifications.

In FIG. 1 it can be seen that the engineered elongate product 1 is made up of a plurality of engineered laminae 2. Most, if not all, include endwise finger joining, such as at 3.

Shown on the top face of the engineered lamina 2 at the top of the assembly 1 are transversely spaced teeth or pin marks 4 which preferably number at least two in each instance. Near the ends of where the originating stick was, such spacing longitudinally near the finger joining 3 is preferably closer than elsewhere.

Such marks 4 need not be identical along the length of the product or be of similar sets. Moreover, the bottom face of the engineered product, as shown in FIG. 1, may not show any such marks at all if the same orientation of the engineered laminae are kept consistent or there is not the use of protuberances on both sides of the individual sticks, as is preferred.

Indeed, a judicious rotation during assembly of the engineered laminae for the lamination, can result in no pin marking being exposed.

FIG. 3A shows a typical stick of the kind contemplated in the aforementioned patent specifications for use in products of the kind disclosed in FIGS. 1 and 2. Shown near a end region 5 are the closer together transverse lines of teeth marks 6 as opposed to the more spaced teeth marks 7. Whilst each set of teeth marks 6 and 7 are shown as being the same (and three in each case) this is only a preferment. The longitudinal spacing between such sets and each sets number of teeth/pins is such as to provide a great pressure near the ends of each stick in the drying process.

FIG. 3A of course shows the stick post the drying step. FIG. 3B shows the end trimmed ready for finger joining and FIG. 3C shows a matched stick to that of FIG. 3B actually finger jointed to provide a continuation of the engineered stick.

Such finger jointing preferably is continuous for each stream and the cutting to length occurs just prior to lamination so that magazines hold the desired length for the purpose of the lamination.

Set down from the top surface of each of the bars onto which sticks are to be positioned (none being shown), are spacing bars, tubes or the like which will serve the purpose of holding the individual rails, bars or fillets as a single frame.

It can be seen that a stick can be positioned on all of the bars 8 between extremities AA.

Figure 1:
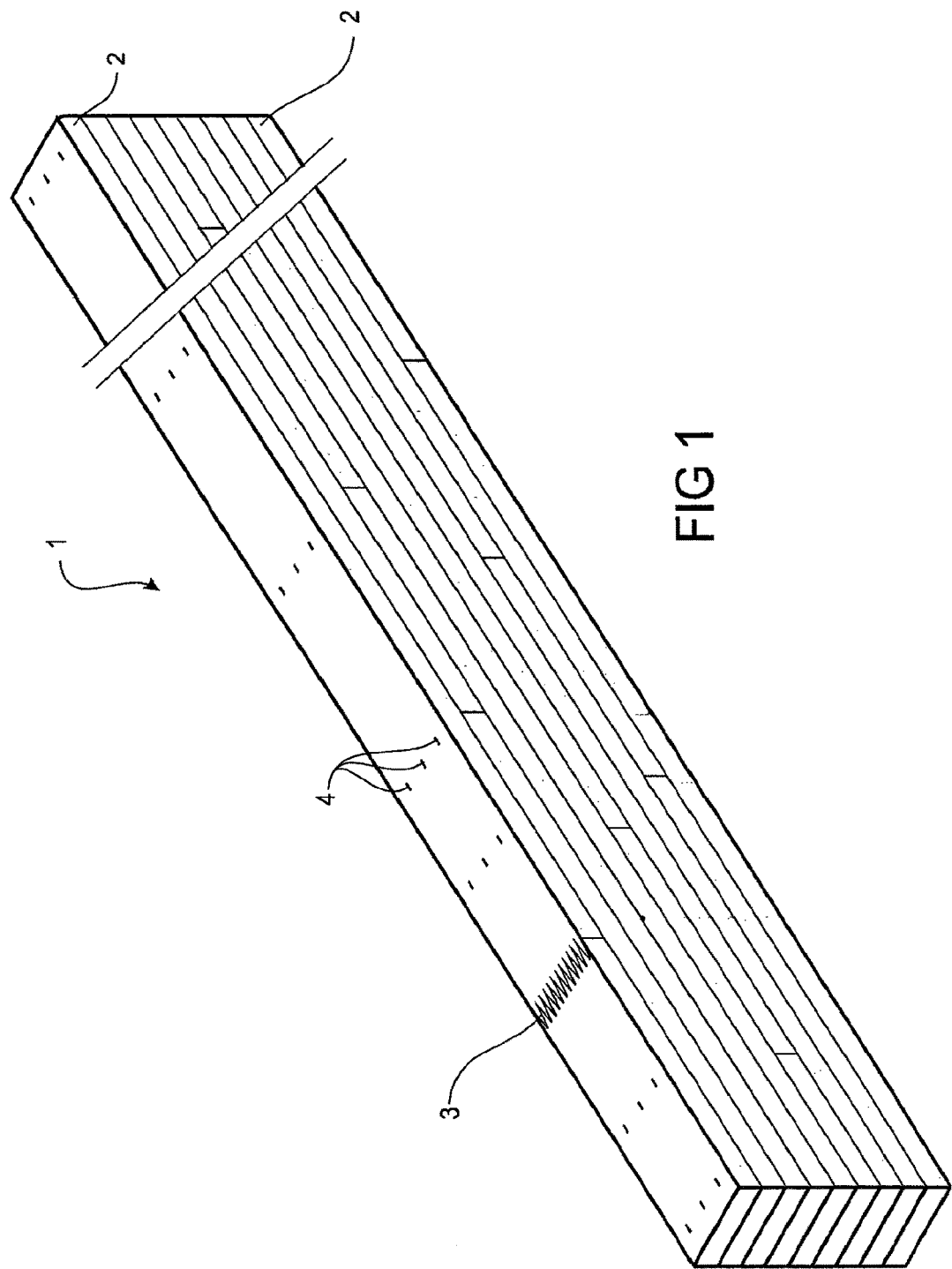
Figure 2:
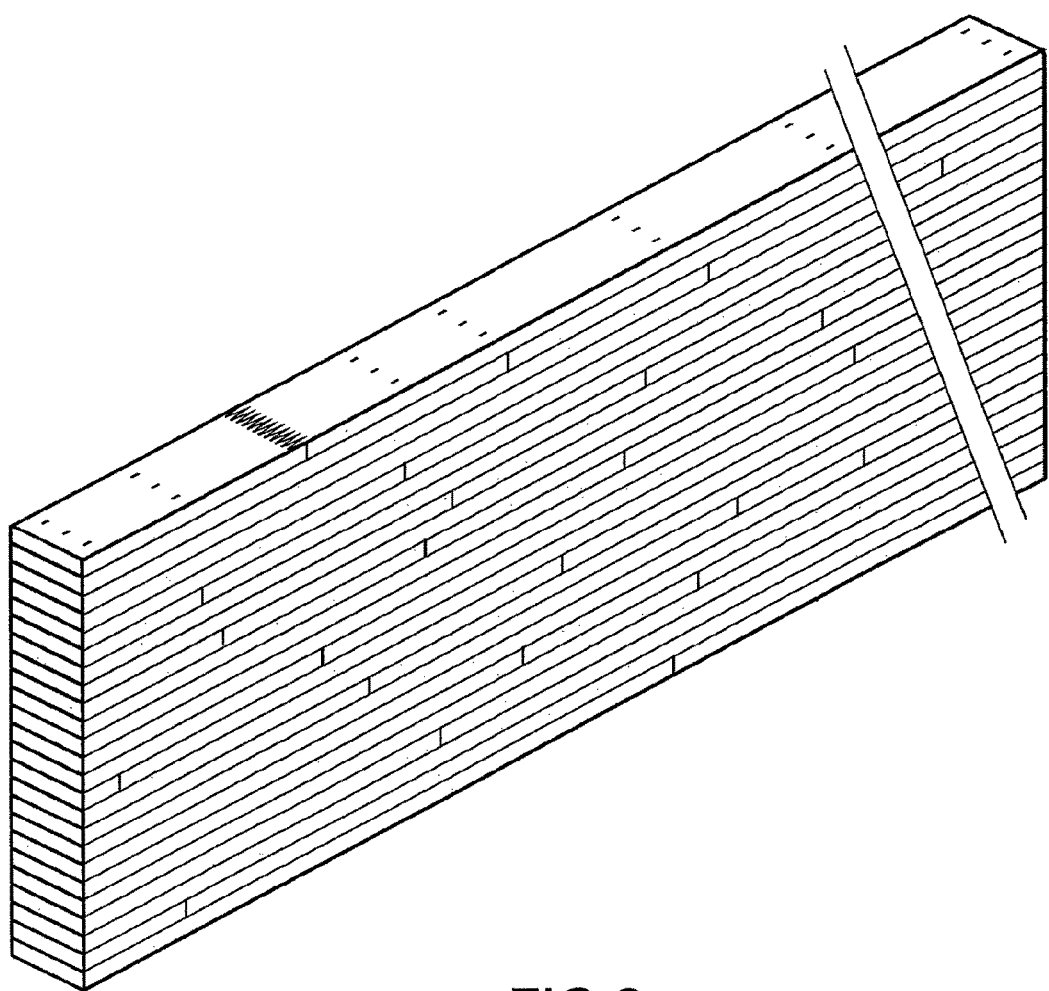
Figure 3A:
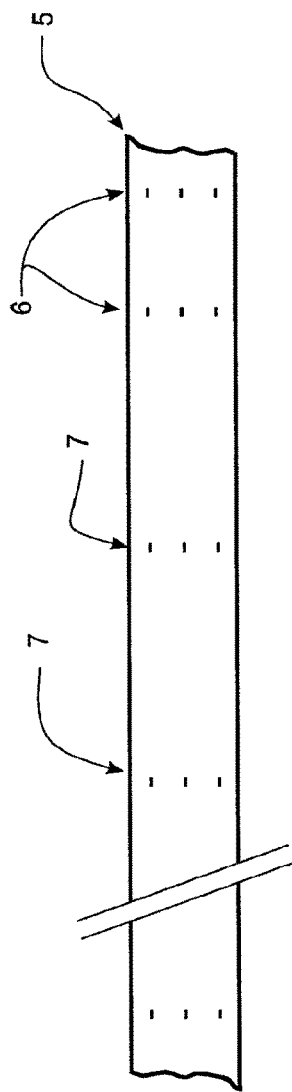
Figure 3B:
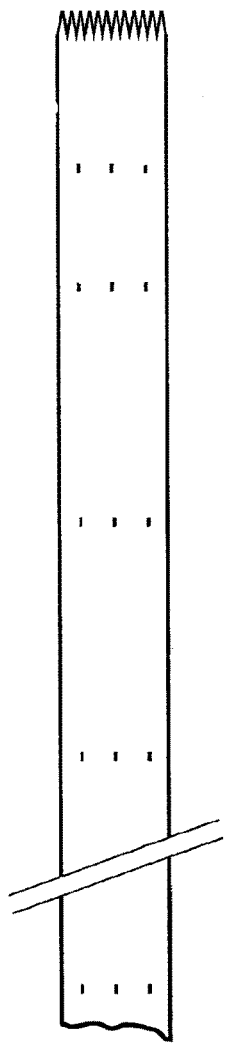
Figure 3C:
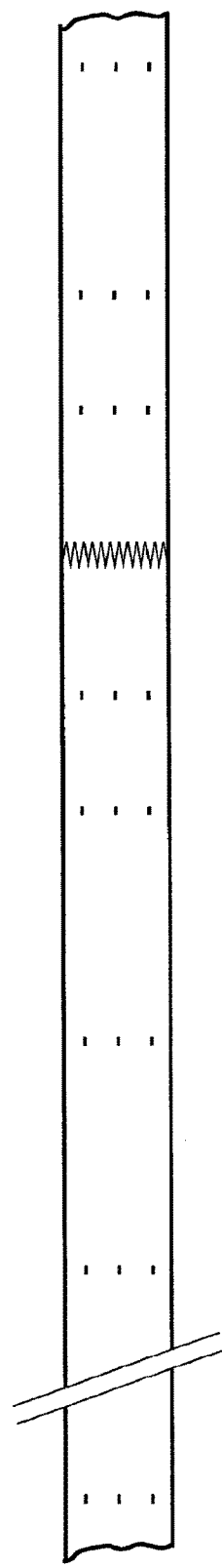
Figure 4:
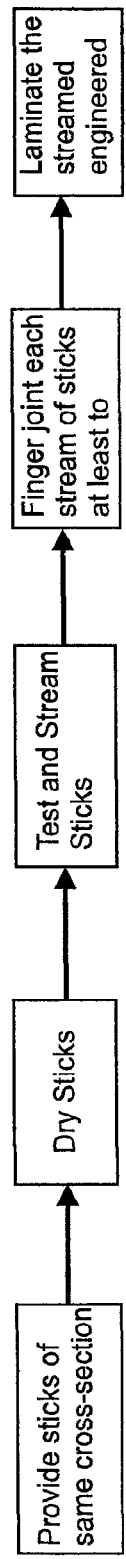
FIG. 4 shows a preferred process whereby products such as shown in FIG. 1 can be made whilst going through the process mentioned with respect to FIGS. 3A to 3C.
Figure 5D:
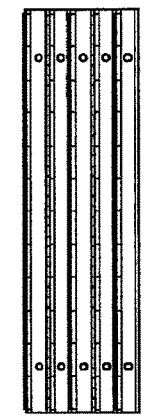
FIG. 5A shows the plan view of a preferred frame or lattice of rails, bars or fillets from that upper side. Sticks, in the absence of upward protuberances, can be slid laterally of the stick axis along each of the bars when substantially horizontal as a support.
Figure 5A:
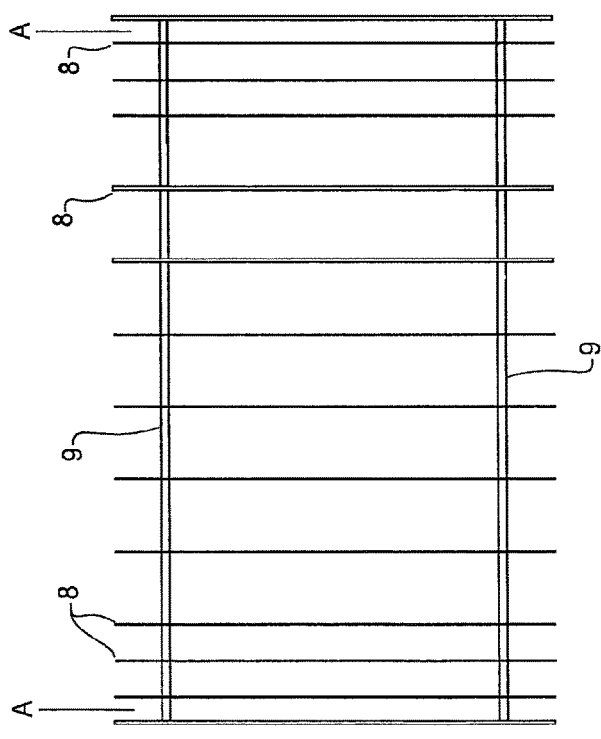
Figure 5C:
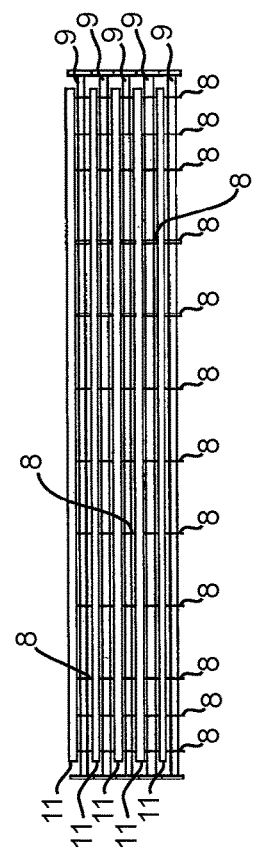
Figure 5B:
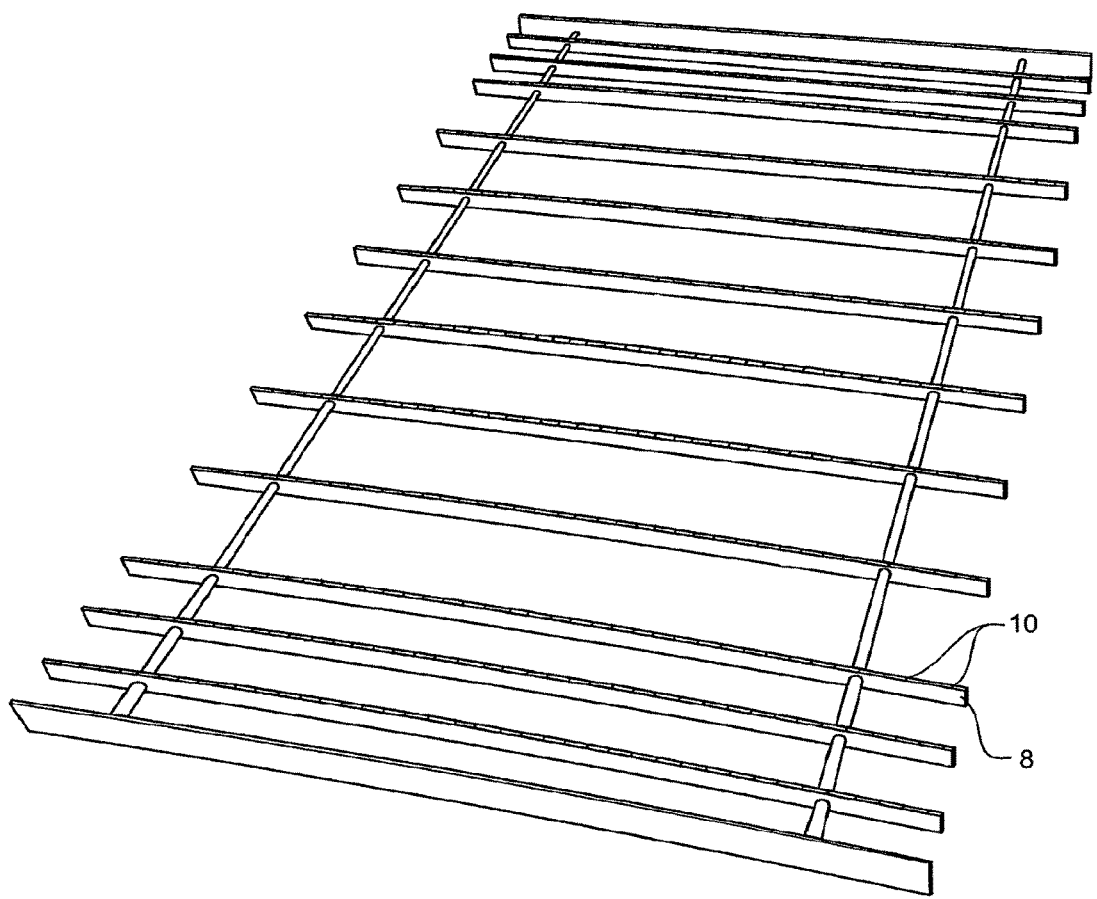

The spanning tubes or bars 9 are preferably the means by which there is a linking of the stack of frames as shown in FIGS. 5C and 5D in the arrangement hereafter described. FIG. 5B shows from below each bar 8 with a plurality of teeth 10 positioned on each underside these teeth are preferably triangular or truncated triangular (eg. plateaued).

Any suitable form can be used however that ensures pressing across the width of a stick in order to hold it constrained.

In the absence of such penetrative members there is the prospect that some part of the lateral width of a face may not have any constraint bearing down on it. At least with the penetrative members it is possible to ensure that there is a spaced constraint on a plurality of places across the face and at different positions along the stick length. All these constraint requires less force owing to the penetrative protuberances.

Preferably each member 8 is being aligned above another to act in reaction as an anvil appropriate so that clamping can take place.

Figure 6:
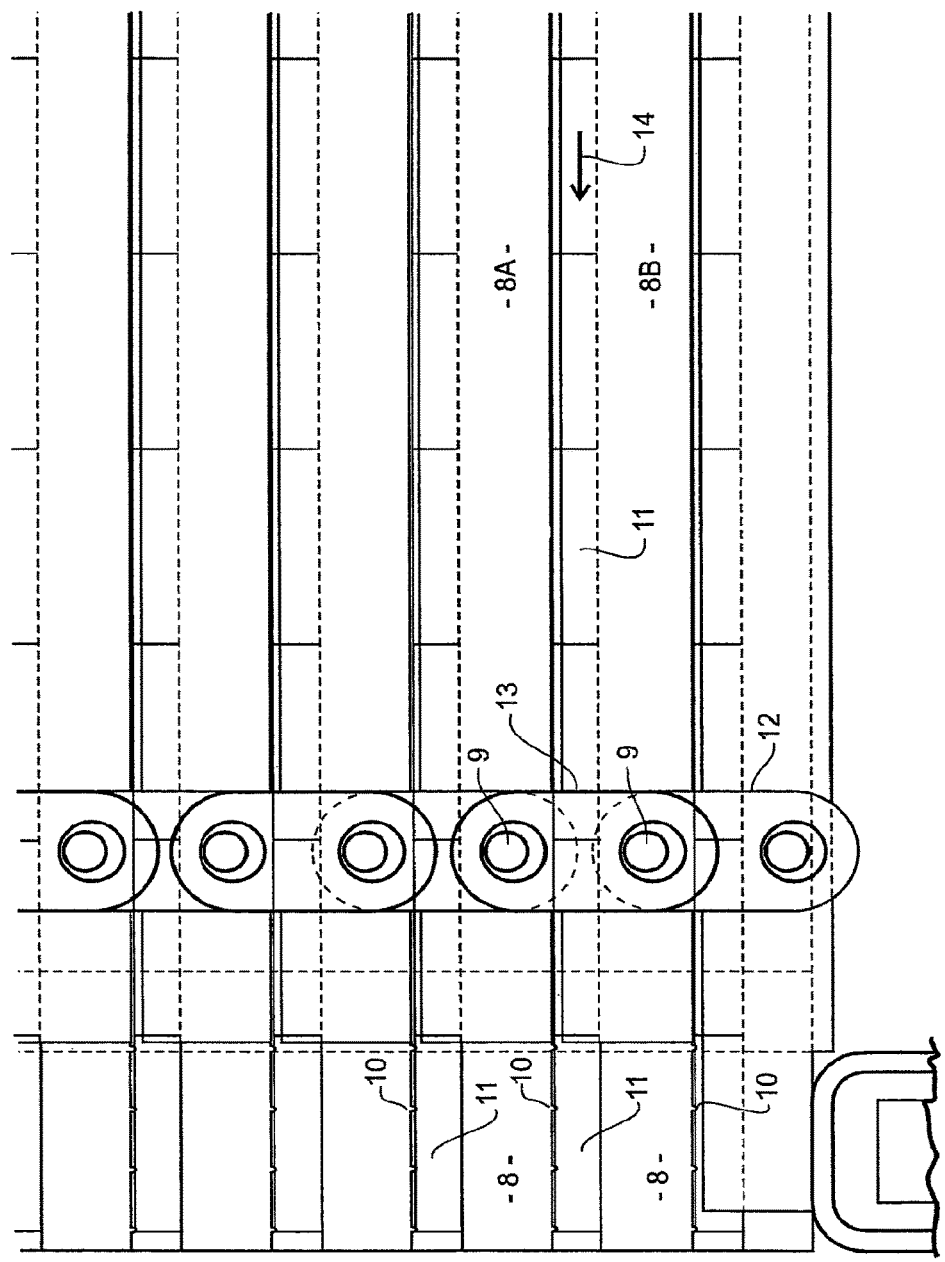
Figure 9A:
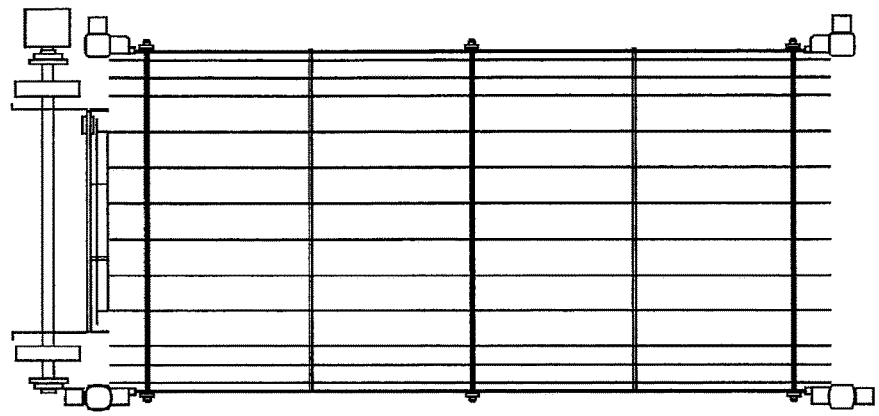
Figure 9B:
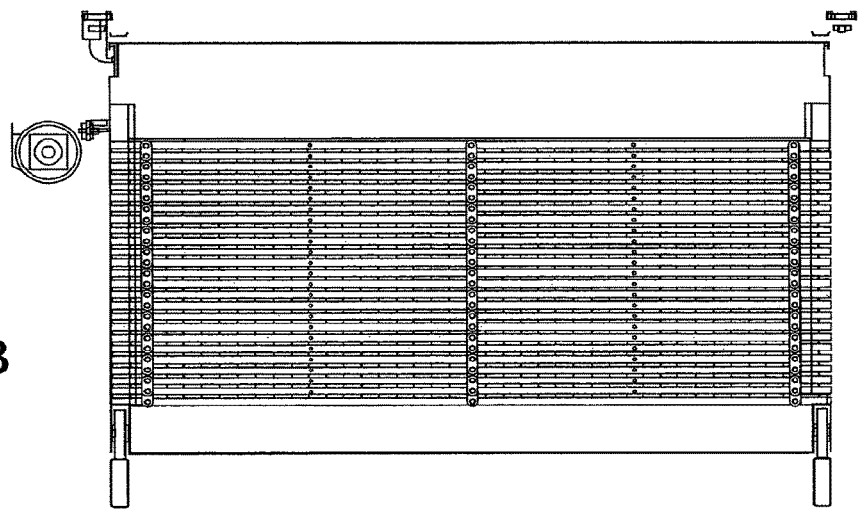
Figure 9C:
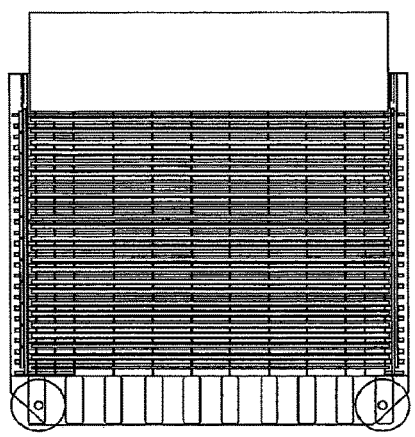

FIGS. 6, 7 and 8 as described show teeth 10 as they might bear into parallel and juxtaposed sticks 11 between bars 8.

Shown in FIG. 6 are parts of the transverse members 9 loosely held within the confines of complementary links 12, 13, etc such that when there is an uplifting of a top most link of the vertical series, the size of the openings of each about a bar or tube 9 provides for a lifting of, say bar 8A from bar 8B, thereby to allow the teeth 10 to be pulled from the individual sticks 11 and thereafter to allow the sticks to be slid, for example, to the left as depicted by the arrow 14.

The fillet spacing and pin spacing on the fillets is a function of the dimension of the wide face of the timber cross section, length of the stick, the number of pins in contact on each piece, the degree of crook minimization and the final weight applied to achieve adequate penetration into the timber for the holding required.

By way of example, for rectangular section sticks, 49 mm×11 mm, are preferred a fillet spacing of 100 mm over the middle section reduced to 50 mm near the ends where the distortion forces are the same but the restraining moment is reduced, are preferred. The rationale is that the closer together the fillets the better is the resistance to crook occurring but because this implies more pins the load required to ensure pin penetration into the timber is increased and more pin marks are potentially visible in the product. An option, as shown, is to reduce the spacing towards the ends.

A preferred pin spacing for preferred 11 mm×49 mm sticks is 15 mm which gives a minimum of three pins across each stick face of 49 mm. Two pins may have been adequate but at least near the ends one pin is not as timber will try to twist/rotate locally near the ends. There is no reason why four, five or six etc, pins across each stick face could not be used except that increased of load is required on the pins in order to drive them into the timber. In prospect is having more pins near the ends and less through the centre.

There is no reason why pins could not be both sides of the fillet but this can make automatic loading and unloading difficult. Both sides would double the holding ability. Single sided allows sliding between lattice frame pairs when the pins are not upward from the underlying frame, lattice or the like but are only downwardly from the overlying frame, lattice or the like.

The pin shape should allow good penetration but easy "break off" (ie. dislodgement or release) from the timber, while having practical resistance to rough handling and ease of manufacture.

Any suitable weight application or pressure application to a preferred vertically expanding stack of the frames can be used so that even the top squeezed layer of sticks is under sufficient hold down loading.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

What we claim is:

1. A method of drying a plurality of sticks of square or rectangular cross-section, said method comprising or including the steps of
    advancing the sticks laterally onto an underlying frame of a plurality of frames comprising at least one adjacent pair of frames, each adjacent pair of frames receiving said plurality of sticks, which will allow drying of the underlying surface of the sticks,
    squeezing the sticks when laterally received on the underlying frame to said underlying frame using an overlying frame carrying spaced penetrative members, said overlying frame with spaced penetrative members penetrating the upper surfaces of the sticks allowing drying of the upper most surface of the sticks, and
    allowing and/or causing drying to occur whilst the sticks are so constrained by such squeezing;
    wherein each adjacent pair of frames is actuatable to constrain said sticks;
    wherein each underlying frame is skeletal; and
    wherein a spacing of rails or bars of each frame are closer together near ends of said sticks than centrally of said sticks.

2. The method as claimed in claim 1 wherein after at least sufficient drying of the sticks whilst constrained to reduce a tendency of crook, the squeezing is released by a lifting of the overlying frame and the sticks are moved laterally from the underlying frame.

3. The method of claim 1 wherein said sticks are contiguous on the underlying frame.

4. The method of claim 1 wherein, when performed in a stack of frames that are skeletal in nature, each adjacent pair of frames acts as a pair of underlying and overlying frames, two or more of the plurality of frames acting as both an overlying frame and an underlying frame of different parts.

5. The method of claim 1 wherein said squeezing the sticks onto the underlying frame using spaced penetrative members of the overlying frame ensures top surface penetration by at least two penetrative members for each stick at each of several positions along the length of the stick.

6. The method is claimed in claim 5 wherein there are at least three penetrative members for each stick at each position along the length of the stick.

7. The method of claim 1 wherein each stick is of substantially identical thickness and is in the thickness range, top surface to bottom surface, of from 5 to 25 mm.

8. The method of claim 7 wherein the range is from 5 to 17 mm.

9. The method of claim 8 wherein the thickness is about 11 mm.

10. The method of claim 1 wherein each underlying frame is of rails or bars fixed in a spaced parallel relationship.

11. The method of claim 10 wherein said penetrative members are on or of an underside of said rails or bars.

12. The method of claim 1 wherein the penetrative members are pins.

13. The method of claim 12 wherein the pins are profiled from a rail or bar of the frame.

14. The method of claim 1 wherein each overlying frame and underlying frame pair matches rail or bar over rail or bar.

15. The method of claim 14 wherein the rail or bars are laterally of the stick axes.

16. The method of claim 15 wherein the penetrative members are of or from the underside of the rails or bars.

17. The method of claim 1 which comprises or includes, in and/or in eventual drying conditions, laterally of the longitudinal axis of the, or each, stick and into one such face of its, or their, wider opened faces, constraining the, or each, stick between:
    said penetrative members able to apply a high localised loading of the stick(s) from multiple bar, fillet or support members, and
    a reactive arrangement on the other face.

18. The method of claim 1, said method comprising or including:
    presenting a plurality of sticks in parallel as a single layer,
    pressing each stick with a bank of pressing members on and/or into at least one face of the sticks, each with the penetrative members, thereby to constrain the sticks against crook, and
    drying the sticks when so constrained.

19. The method of claim 1, wherein whilst the sticks are constrained, said method comprising interposing the sticks between said adjacent pairs of frames, and against at least one frame using said penetrative members of the other frame of said adjacent pair of frames, the penetrative members configured to be penetrative of the sticks.

20. The method of claim 1, wherein said penetrative members are provided as sets, each set spaced apart from another along the length of the frame.

* * * * *